Aug. 14, 1934.  S. LUDLOW, JR  1,970,011
AIR MAIL RECEPTACLE
Filed July 29, 1930
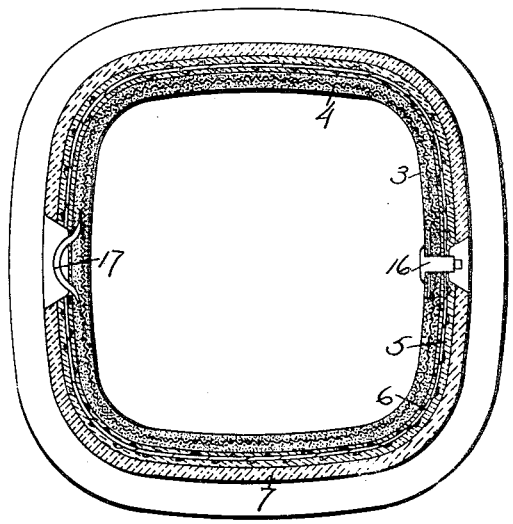
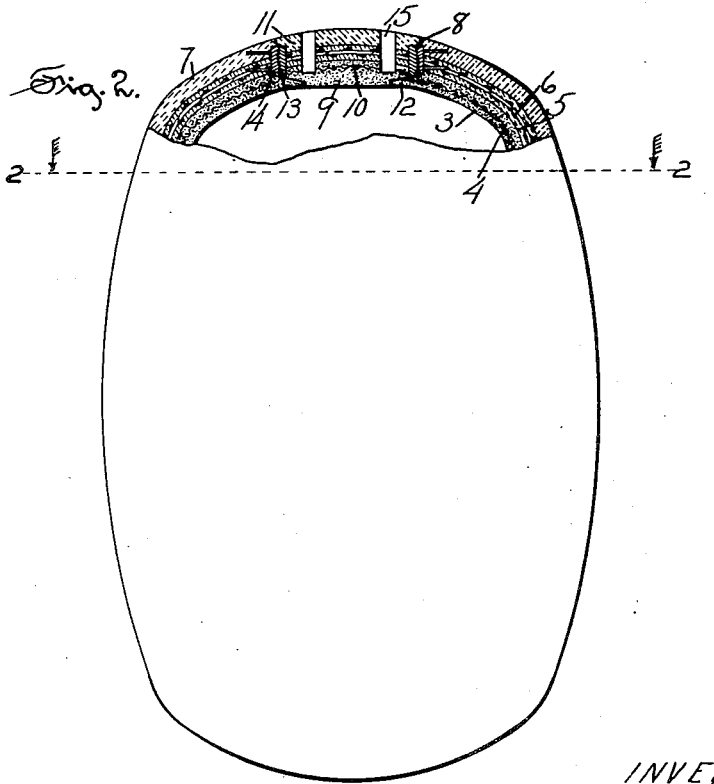
INVENTOR.
Samuel Ludlow, Jr,
by
Arthur B Jenkins
ATTORNEY.

Patented Aug. 14, 1934

1,970,011

UNITED STATES PATENT OFFICE 1,970,011

AIR MAIL RECEPTACLE

Samuel Ludlow, Jr., West Hartford, Conn.

Application July 29, 1930, Serial No. 471,450

7 Claims. (Cl. 150—13)

My invention relates to that type of receptacles that are especially constructed to receive mail for transportation by air vehicles, and an object of my invention, among others, is the production of a receptacle for such purposes which receptacle shall be light as to weight and at the same time strong and effective to resist shock or concussion; a further object is to provide a receptacle usable for the purposes herein mentioned, which receptacle shall have heat resisting qualities sufficient to safeguard the contents thereof; another object is to provide such a receptacle with qualities whereby it may automatically free itself from a wreck resulting from a crash or fall of the vehicle and thereby escape the results of fire therefrom; a still further object of the invention is the provision in such a receptacle of means for protecting its contents from the results of fire, should it be subjected thereto, and a still further object of the invention is to provide such a receptacle with buoyant qualities to cause it to float if thrown into water.

One form of a receptacle embodying my invention, and in the construction and use of which the objects herein set out, as well as others, may be attained, is illustrated in the accompanying drawing, in which—

Figure 1 is a view in section on a plane denoted by the dotted line 2—2 of Figure 2.

Figure 2 is a side view of my improved receptacle with the entrance end broken away to show construction.

Since the advent of vehicles designed for air transportation purposes the losses, particularly as to mail matter, have been very great and it has therefore become apparent that some means shall be provided whereby such losses may be greatly reduced, if not practically eliminated. These losses result from various causes, such as fire, rupture of receptacles containing mail matter as a result of concussion and shock occasioned by falls and with a consequent scattering and loss of the contents.

In order to overcome these objectionable results I have invented a receptacle, illustrated and described in this specification, which receptacle is preferably of a shape to present curved surfaces on all sides, being somewhat rectangular in shape in cross section but with decidedly rounded corners. It is of oblong shape with curved sides and pronounced rounded ends. The walls of this receptacle comprise an inner or lining ply or layer 3 that is composed to a great extent of heat resisting material, such as asbestos. This is preferably in the form of interwoven fiber, as illustrated herein, and it may be reinforced by wire as spring steel wire 4 preferably disposed in spiral form.

An intermediate layer or ply 5 closely envelops the inner or lining ply, and this intermediate ply is preferably composed of rubber of a high grade which is reinforced with threads or cords 6 to provide an extremely tough and strong fabric, the threads or cords being incorporated with the rubber to form the fabric in a manner similar to that employed in the construction of cord vehicle tires.

An outer layer or ply 7 is formed to closely envelop the structure thus far described, this outer layer comprising the covering ply. It is preferably composed of rubber sufficiently flexible to enable it to readily yield to the effects of blows, but sufficiently tough and strong to resist wear.

The wall of this improved structure comprising the three layers or plies 3, 5, and 7 may be built up in a manner readily understood by those skilled in the art, and it will be compressed and vulcanized into practically a homogeneous mass, thereby making said wall rigid enough to be self-sustaining and sufficiently flexible to readily resume its normal shape after having been distorted as from the effects of blows or other causes. An opening 8 is formed, preferably at one end of the structure, through which articles are passed into and out of the receptacle. These articles may be enclosed in a mail bag or similar receptacle or they may be separately placed therein. This opening is closed by a cover or plug built up much in the same manner as hereinabove described with respect to the wall of the receptacle. This plug comprises an inner ply 9 largely composed of asbestos or other suitable heat resisting material, preferably in the form of fiber and reinforced in any suitable manner. An intermediate layer or ply 10 built up in a manner similar to that of the ply 5 of the receptacle is intimately united with the asbestos layer, and an outer layer or ply 11 composed principally of rubber similar to that of the outer ply 7 of the receptacle is closely secured to the intermediate layer, the whole being compressed or vulcanized into a compact structure to comprise a plug.

A lip 12 is formed to extend around the inner edge of the opening 8, and as shown in Figure 1 of the drawing, the extreme inner end of the plug comprising the asbestos ply extending through the opening formed by said lip and the latter underlying the peripheral portion of said ply, thereby forming a practically air-tight joint at this point, and for a purpose to be presently described. A shell 13, preferably of metal, or at least of some material that will maintain a thread, is securely fastened to the plug, this shell, when the plug is in place in the opening, resting against and being protected by the lip 12. A sleeve 14, also of metal, or other material that will sustain a thread, is securely fastened as by means of prongs vulcanized into the wall of the receptacle surrounding the opening 8, this sleeve being threaded to fit the thread on the shell 13, whereby the plug may be securely fastened in place. The outer end of the plug, composed of the outer ply of rubber, overlies the end of the shell and similarly the outer ply of the receptacle is formed to overlie the end of the sleeve 14. Thus the rubber ply of the plug closely abuts the rubber or outer ply of the receptacle and the asbestos inner ply of the plug closely abuts the inner or lining ply on the receptacle wall. Holes 15 may be formed in the plug to receive a forked wrench or other tool whereby the plug may be removed from the opening or inserted therein.

A nipple 16, of any suitable construction to permit the receptacle to be inflated, is secured in the wall of the receptacle, communicating with the interior thereof, and this is made use of, after the receptacle has been loaded, to create air pressure within the structure. When such pressure is introduced the lip 12 will be forced tightly against the inner end of the plug, thereby sealing the joint at this point.

Inflation of the receptacle will provide it with bounding qualities sufficient, in many cases, to cause it to bound entirely clear from a vehicle and beyond the fire zone, in the event of a fire resulting from a sudden and forced descent of the vehicle, and in which event all danger of loss by fire will be avoided.

In order to prevent bounding of the receptacle beyond certain limits within the safety zone, a ring 17 may be securely fastened within the wall of the receptacle, to which ring a cord or cable of any desired make may be secured. This may also be employed in connection with a parachute for landing purposes of the receptacle if desired.

In addition to the qualities hereinbefore described for preserving mail matter from injury the structure is also equipped to preserve the contents from fire when such may develop. In the event of burning of a vehicle used in air transportation a fire is generally shortlived, and I have therefore designed the wall of my improved receptacle having this fact in mind. Should the receptacle be retained in the vehicle at such times the walls are sufficiently fire resisting to withstand the heat of short duration that usually takes place.

In addition to increasing the bounding qualities of the receptacle the inflation thereof provides buoyant qualities which will aid in keeping the receptacle afloat should it fall into the water. This air pressure within the receptacle not only increases its bounding qualities and its buoyant qualities but it also acts as a support for the lining or inner ply composed largely of asbestos, and therefore assists in preventing rupture of said lining.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. An air mail receptacle having an opening in its wall for the placing of contents therein, said opening having a flexible lip surrounding its edge to aid in hermetically sealing said opening, a plug secured in said opening with its end overlapping said lip, and means to provide for inflating said receptacle.

2. An air mail receptacle having an opening in its wall for the placing of contents therein, said wall being composed of material arranged in layers, the inner layer extending inwardly beyond the boundary of said opening to form a lip to aid in hermetically sealing said opening, and a plug secured in said opening with its inner end overlapping said lip.

3. An air mail receptacle having an opening in its wall for the placing of contents therein, said wall embodying in its structure a heat resisting material, a sleeve secured in said opening with its inner end protected by said heat resisting material, a plug embodying a bounding shell and a heat resisting material underlying the edge of said shell, and means for securing said shell to said sleeve.

4. An air mail receptacle having an opening in its wall for the placing of contents therein, said wall being composed of resilient material and embodying a heat resisting material, a threaded sleeve forming the wall of said opening and having prongs embedded in the material of said wall, the inner end of said sleeve being underlaid by said heat resisting material, and a plug embodying a shell threaded to fit the thread of said sleeve, said plug embodying a heat resisting material underlying said shell.

5. An air mail receptacle having an opening in its wall for the placing of contents therein, said wall being composed of elastic material formed of plies one of which is composed of heat resisting material, and another of which is composed of a strengthening fabric, and a plug secured within said opening and composed of plies arranged similarly to those in the wall of the receptacle.

6. An air mail receptacle having an opening in its wall for the placing of contents therein, said wall being composed of elastic material arranged in plies, one ply comprising a heat resisting material, another ply comprising a strengthening fabric and an outer ply composed of rubber, a plug secured in said opening and composed of plies of the same material and arranged substantially in the same manner as those in the wall of the receptacle, and means for inflating said receptacle.

7. An air mail receptacle constituting a case having an inner ply composed of heat resisting material reinforced to stiffen it, an intermediate ply composed of rubber reinforced with threads or cords, an outer and covering ply composed of unreinforced rubber, said case having an opening for the placing of contents therein, means for hermetically sealing said opening, and means for inflating the entire interior of said receptacle.

SAMUEL LUDLOW, Jr.